Dec. 10, 1957   G. ELLIOTT   2,816,262
VOLTAGE SENSITIVE DEVICE
Filed April 23, 1956

INVENTOR.
GEORGE ELLIOTT
BY
AGENT

¹ United States Patent Office 2,816,262
Patented Dec. 10, 1957

2,816,262

VOLTAGE SENSITIVE DEVICE

George Elliott, Rochester, N. Y., assignor to General Dynamics Corporation, Rochester, N. Y., a corporation of Delaware Application April 23, 1956, Serial No. 580,038

7 Claims. (Cl. 323—15)

My invention relates to voltage sensitive devices in general and more particularly to voltage sensitive devices suitable for use in power supply regulating systems.

In telephone exchanges it is the practice to provide a battery for supplying power through busbars to a load comprising the apparatus within the exchange. A voltage dropping device, such as a so-called countercell, is normally connected between the battery and the busbars in order to reduce the voltage delivered to the load. Switching means is provided for making the voltage reducing means ineffective (shorting out the countercell) during the time that the battery voltage is below a predetermined minimum value, thereby tending to stabilize the voltage delivered to the exchange apparatus.

In the past, it has been the practice to provide electromechanical means, such as a relay or relays, for the purpose of detecting voltage changes between the busbars. While such electromechanical devices can be made sufficiently sensitive within the required voltage limits, their accuracy may vary when the devices are exposed to physical disturbances, temperature changes, and the like. Electromechanical devices which are designed to overcome the effects of such disturbance tend to be expensive both from the point of view of original cost and maintenance.

Accordingly, it is an object of my invention to provide a new and improved voltage sensitive circuit.

Another object of my invention is to provide a voltage sensitive relay controlling circuit.

Another object of my invention is to provide a voltage sensitive relay controlling circuit which resists the effects of physical disturbance, temperature changes, and the like.

Another object of my invention is to provide a voltage sensitive relay controlling circuit which is highly sensitive to voltage changes.

I accomplish these and other objects in a system including a direct current source having a voltage which may vary within specified limits, a load, and means such as a countercell connected between the source and the load normally effective for reducing the voltage delivered to the load. The system also includes relay means operable to render the voltage reducing means ineffective. In the preferred embodiment of my invention, the relay means is operable to short out the countercell in order to raise the voltage delivered to the load.

According to the invention, an output portion of a control device such as a transistor is effective for controlling the relay means. An input portion of the control device is effective for controlling current flowing through the output portion and is connected in a circuit including a nonlinear, resistive element such as a diode having a Zener voltage characteristic across the load. Other elements in the connecting circuit are chosen so that the resistive element is substantially non-conductive in response to the application of a voltage below a predetermined minimum placed across the load and the circuit and conductive in response to the application of a voltage to the load and circuit exceeding the predetermined minimum voltage. Thus, when the voltage across the load is higher than the predetermined minimum, current flowing through the control circuit is effective for causing the relay means to include the countercell in series with the battery source; similarly, when the voltage across the load has dropped below the predetermined minimum, the connecting circuit is non-conductive, causing the relay means to become operative to short out the countercell in order to increase the voltage across the load.

Further objects and advantages of my invention will become apparent when considered in connection with the following description and the accompanying drawings in which.

Figure 1:
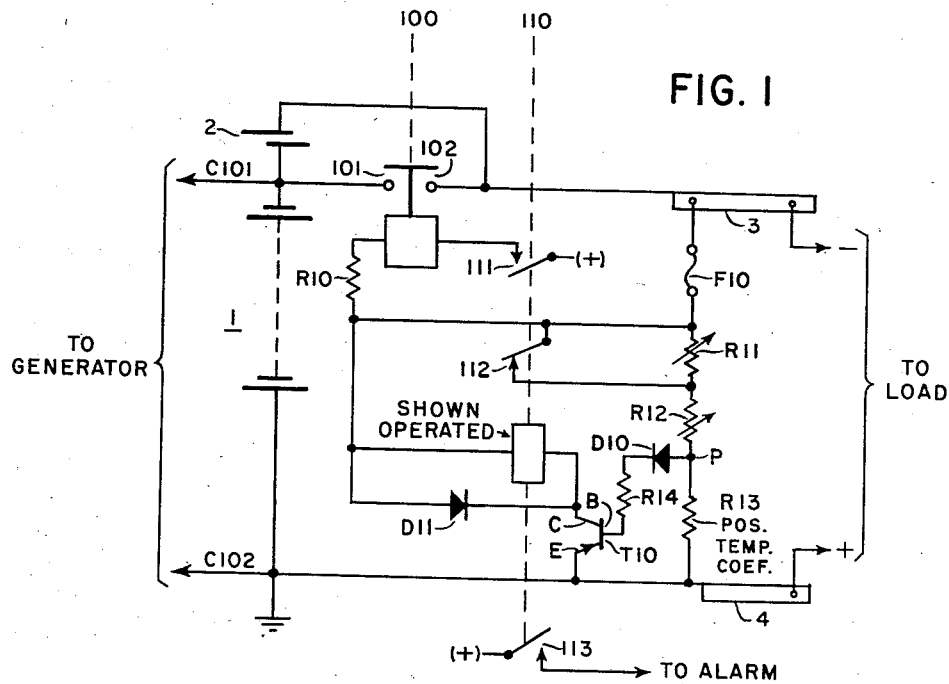
Fig. 1 illustrates the preferred embodiment of my invention.
Figure 2:
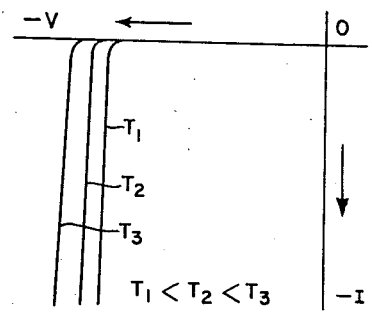
Fig. 2 shows graphically the voltage-current relationship at several different temperatures of a nonlinear element of the type used in the preferred embodiment of my invention.

In the preferred embodiment of my invention, a source of direct current comprising 52-volt battery 1 is suitable for supplying energy to a telephone system. Battery 1 is arranged so that its most positive plate is grounded. This side of the battery is hereinafter referred to as "ground" in the description and (+) in the drawings. The most negative, ungrounded plate is referred to in the description as "battery" and in the drawings as (—).

Current from the battery is delivered to the exchange which forms the load by way of positive and negative busbars 4 and 3, respectively. Positive busbar 4 is connected directly to the grounded side of the battery. Under normal conditions the negative busbar 3 is connected to the battery through a voltage dropping or reducing device comprising countercell 2. Thus, in order to deliver 50 volts to the load at the busbars, it is necessary that the battery produce the rated 52 volts.

When battery 1 is discharged to the point where the voltage delivered to the load drops below a first predetermined value (48 volts in the preferred embodiment of my invention), means comprising switching relay 100 is effective for shorting out the countercell 2 in order to connect the most negative plate of the battery directly to the negative busbar and thereby to raise the voltage at the busbars to that of battery 1. This is accomplished by closing an obvious circuit including make contacts 101 and 102 of relay 100. The operation of relay 100 is controlled by an operating circuit which is traced from ground through normally open break contacts 111, the winding of relay 100, resistor R10, fuse F10 and busbar 3 to battery.

Contacts 111 in the previously traced operating circuit of relay 100 are controlled by means comprising relay 110. In the preferred embodiment of my invention, relay 110 is maintained operated when the voltage delivered to the busbars exceeds 48 volts and releases to operate relay 100 by closing break contacts 111 when the voltage delivered to the busbar drops below 48 volts. The apparatus for controlling the operation of relay 110 is next described.

Relay 110 has an operating circuit which includes the output portion of means such as pnp transistor T10. The circuit is traced from ground through emitter E, base B, and collector C of transistor T10, the winding of relay 110, fuse F10 and busbar 3 to battery. Thus, when transistor T10 is conducting, relay 110 operates over the above-traced circuit.

In order to cause transistor T10 to conduct when the voltage delivered to the busbars exceeds 48 volts, base B of transistor T10 is maintained negative with respect to emitter E. Base B is part of an input circuit for transistor T10 which is traced from battery through busbar 3, fuse D10, normally closed make contacts 112 of relay 110, resistor R12, diode D10, resistor R14, base B, and emitter E to ground. The maintenance of base B negative with respect to emitter E is dependent upon the flow of a minimum current through the input circuit including diode D10.

Diode D10 is a non-linear resistance of the so-called avalanche type which has a high reverse voltage resistance up to the breakdown point. Upon the application of reverse voltage in excess of the breakdown voltage, the diode passes rapidly increasing amounts of current in response to small voltage increases. Diode D10 is connected in the input circuit so that its rapid breakdown characteristics are used to make the input circuit voltage sensitive. To this end, resistors R12 and R14 are chosen so that the absolute voltage drop across diode D10 is very close to but slightly higher than the conducting voltage when the voltage between the busbars is slightly in excess of 48 volts. Thus, when the voltage delivered to the busbars drops below 48 volts, the absolute voltage across diode D10 is reduced to a point below the critical value. The resistance of diode D10 rises, thereby reducing flow in the above-traced input circuit. The base current then falls substantially to zero so that current flowing through the above-traced output circuit falls below the point sufficient to maintain relay 110 operated. Relay 110 thereupon releases.

The release of relay 110 is effective to close the above-traced operating circuit for relay 100 at break contacts 111 in order to short out the countercell 2 at make contacts 101 and 102. The release of relay 110 is also effective to remove the short around R11 so that resistor R11 is now included in series with the above set forth elements of the transistor input circuit. The inclusion of resistor R11 is effective to lower the voltage drop across diode D10 in order to prevent diode D10 from conducting immediately when the operation of relay 100 raises the voltage delivered to the busbars and the transistor input circuit.

Battery 1 may be recharged by means including a generator (not shown) to the point where its output voltage exceeds a second predetermined value (54 volts in the preferred embodiment of my invention). At this point the value of the resistors including R11, R12 and R14 of the input circuit are such that the voltage across diode D10 exceeds the breakdown voltage of the diode. Accordingly, diode D10 again passes sufficient current to swing the voltage on base B negative with respect to emitter E of transistor T10. Thereupon the above-traced output circuit of transistor T10 passes sufficient current to reoperate relay 110.

The reoperation of relay 110 releases relay 100 by opening at break contacts 111 the previously traced operating circuit for relay 110. Relay 100 thereupon releases and opens the short around countercell 2 at contacts 101 and 102 in order to place the countercell in series with the battery and the busbars, thereby reducing the voltage at the busbars to a point below the predetermined high voltage and above the predetermined low voltage. The operation of relay 110 shorts out resistor R11 at now closed contacts 112. Under these conditions the voltage applied to base B is increased by an increment in order to prevent the above-described decrease in voltage applied to the input circuit from immediately reducing the voltage across diode D10 to the point where D10 is made nonconducting.

The voltage breakdown characteristic of diodes such as D10 are subject to change with ambient temperature. Thus as the ambient temperature at diode D10 is increased, the absolute value of the voltage required to make diode D10 conduct in the reverse direction is increased. Uncompensated, a change in the ambient temperature at diode D10 would result in a change in the points at which the transistor input circuit is made effective in the above-described manner to control the output circuit. In order to compensate for this drift, I have provided a network comprising resistor R13 for compensating the voltage applied to diode D10 in the face of changes in temperature. Resistor R13 has a positive temperature coefficient, i. e., as the ambient temperature at R13 is raised, the resistance increases. Resistor R13 is placed in parallel with that part of the input circuit that includes diode D10, resistor R14, base B and emitter E. The current flowing through resistor R13 and the remainder of the input circuit including resistor R12, resistor R11 or contacts 112, and fuse F10 and the current flowing through the input circuit including diode D10 controls the voltage drop between point P and ground and therefore the voltage applied to diode D10. As the ambient temperature rises and the need for increased voltage to break down diode D10 arises, the resistance of R13 increases. The resulting decrease in current flow through R13 raises the voltage at point P with respect to ground, thereby increasing the voltage drop across diode D10. Similarly, a decrease in ambient temperature lowers the resistance of resistor R13 and increases the current flow in the compensating network. The resulting decrease in voltage at point P with respect to ground decreases the voltage drop across diode D10.

The circuit forming the preferred embodiment of my invention in which relay 110 has a 5500 ohm winding, a 2N44 transistor is supplied as transistor T10, and an 1N207 diode is supplied as diode D10 can be made to regulate the voltage of a nominal 48 volt battery between the limits of the 46 and 54 volts when resistors having the following values are used:

R11 variable, 0–200 ohms
R12 variable, 0–200 ohms
R13, 10,000
R14, 22,000

While I have shown and described the preferred embodiment of my invention, it will be obvious to those skilled in the art that changes and modifications may be made without departing from the spirit of my invention. Accordingly, I aim in the appended claims to cover all such changes and modifications as fall within the true spirit and scope of my invention.

What is claimed is:

1. In a system for controlling the voltage delivered from a direct current source to a load, means for changing the voltage delivered from said source to said load, relay means operative for rendering said changing means effective, a device having an output circuit and an input circuit operative for controlling said output circuit, a circuit including said output circuit for energizing said relay means, a control circuit including a nonlinear resistive element for controlling said input circuit, said resistive element being conductive in response to the application of a voltage to said load above a predetermined minimum value in order to energize said relay means circuit and being substantially nonconductive in response to the application of a voltage to said load below the predetermined minimum in order to de-energize said relay means circuit, and means operative in response to the de-energization of said relay means for increasing the value of the voltage applied to said load that is required to render said resistive element operative, whereby said relay means is not immediately energized upon the increase in voltage delivered to said load caused by the making of said voltage reducing means inoperative and is not immediately de-energized upon a decrease in voltage delivered to said load caused by the subsequent making of said voltage reducing means operative.

2. The system set forth in claim 1 wherein the voltage required to render said resistive element conductive is increased with an increase in the ambient temperature of said element, said system also including a network comprising a resistor having a positive temperature coefficient in parallel with a part of said control circuit including said resistive element and in series with the remainder of said control circuit for increasing the voltage drop across said resistive element as the ambient temperature of said system increases in order to compensate said system for the effect of temperature changes on said resistive element.

3. In a system for controlling the votlage delivered from a direct current source to a load, means for changing the voltage delivered from said source to said load, relay means operative for rendering said voltage changing means effective, a device having an output circuit and an input circuit operative for controlling said output circuit, a circuit including said output circuit for energizing said relay means, a control circuit including a nonlinear resistive element for connecting said input circuit to said load, said resistive element being conductive in response to the application of a voltage to said load above a predetermined minimum in order to energize said relay means circuit and being subsequently nonconductive in response to the application of a voltage to said load below the predetermined minimum in order to de-energize said relay means circuit, a resistor, and means operative in response to the de-energization of said relay means for inserting said resistor in series wtih said control circuit, whereby the voltage applied to said control circuit including said resistor required to render said resistive element conductive is raised above the voltage required to render said resistive element conductive in said control circuit without said resistor.

4. The system set forth in claim 3 wherein the voltage required to render said resistive element conductive is increased with an increase in the ambient temperature of said element, said system also including a network comprising a resistor having a positive temperature coefficient in parallel with a part of said control circuit including said resistive element and in series with the remainder of said control circuit for increasing the voltage drop across said resistive element as the ambient temperature of said system increases in order to compensate said system for the effect of temperature changes on said resistive element.

5. In a system for controlling the voltage delivered from a battery to a load, a countercell in series with said battery in said load for reducing the voltage delivered by said battery to said load, means operative for shorting out said countercell in order to render said countercell ineffective, a relay having a winding effective in its released condition for operating said shorting means, a transistor comprising an emitter, a base and a collector, a circuit comprising said emitter, said base, said collector and said winding for operating said relay, a control circuit including an avalanche type diode for connecting said emitter and said base to said load, said diode being conductive in response to the application of a voltage to said load above a predetermined minimum in order to maintain said relay circuit conductive and substantially nonconductive in response to the application of a voltage to said load below the perdetermined minimum in order to render said shorting means effective when the voltage delivered to said load drops below the predetermined value.

6. The system set forth in claim 5 and having in addition a first resistor and means operative in response to the de-energization of said relay for inserting said first resistor in series with said control circuit, whereby the voltage applied to said control circuit including said resistor that is required to render said diode conductive when said relay is released is raised above the voltage applied to said control circuit without said resistor that is required to make said diode nonconductive when said relay is operated.

7. The system set forth in claim 5 wherein the voltage required to render said diode conductive increases as the ambient temperature of said diode increases, and having in addition a resistor having a positive temperature coefficient in parallel with that portion of said control circuit including said diode, said base and said emitter and in series with the remainder of said control circuit for increasing the voltage drop across said diode as the ambient temperature rises, in order to compensate for the effect of temperature changes on said diode.

References Cited in the file of this patent
UNITED STATES PATENTS

| | | |
|---|---|---|
| 2,282,344 | Ruben | May 12, 1942 |
| 2,617,913 | Oestreicher | Nov. 11, 1952 |
| 2,751,549 | Chase | June 19, 1956 |